April 18, 1961 P. W. NACHTRIEB 2,980,361
CASTING FISHING REEL
Filed July 6, 1959 3 Sheets-Sheet 1

INVENTOR
PAUL W. NACHTRIEB
BY
ATTORNEY

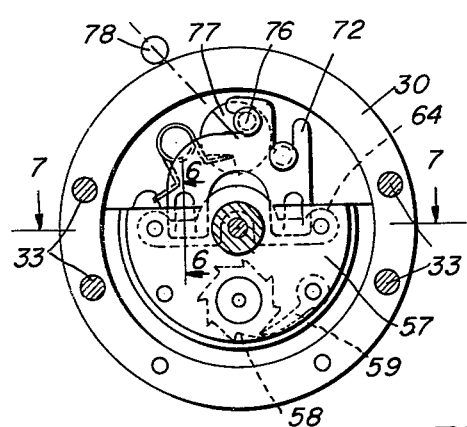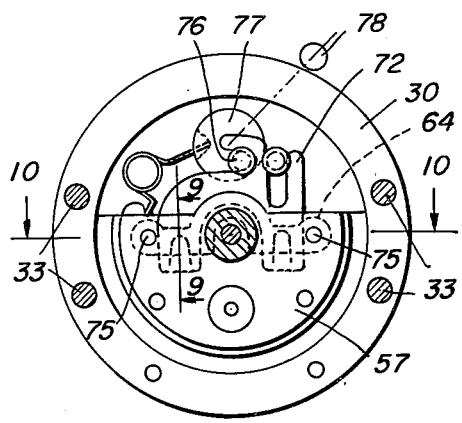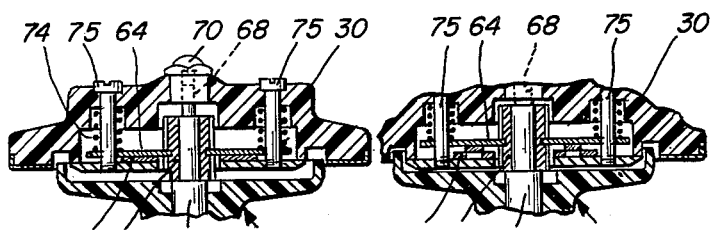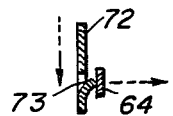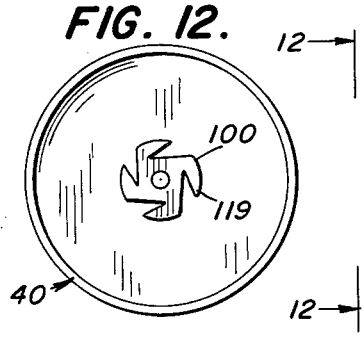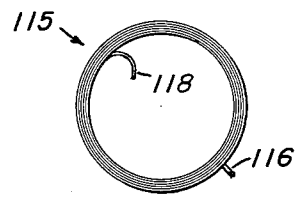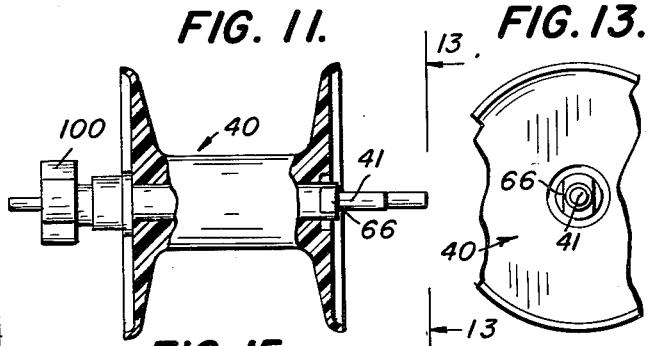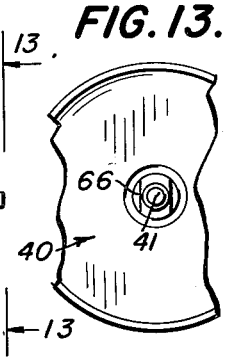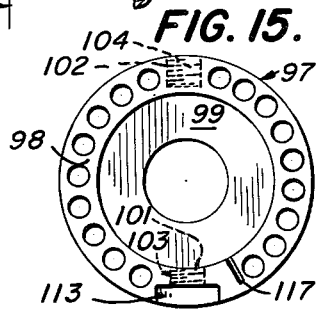

April 18, 1961 P. W. NACHTRIEB 2,980,361
CASTING FISHING REEL

Filed July 6, 1959 3 Sheets-Sheet 3

INVENTOR
PAUL W. NACHTRIEB
BY
ATTORNEY

United States Patent Office 2,980,361
Patented Apr. 18, 1961

2,980,361
CASTING FISHING REEL
Paul W. Nachtrieb, 3517 Ashwood Ave.,
Los Angeles 66, Calif.
Filed July 6, 1959, Ser. No. 825,253
6 Claims. (Cl. 242—84.3)

This invention relates to a casting fishing reel device for attachment to a fishing pole, and in particular to a casting reel which positively feeds out line during the operation of casting.

In fishing reels heretofore used for making a cast, that is to throw out a length of line to which a sinker and bait are attached, the line is unwound from the reel by the force applied to the end of the line having the hook and sinker, there usually being provided a certain amount of slack in the line prior to the actual casting movement of the pole, which is part of the casting procedure. In this operation, the effective force of casting the hook and sinker is partly overcome or canceled out by the starting inertia of the spool which at the start is stationary and not revolving, but which must be set in motion when the slack line is all taken up, and additional line must be unwound from the reel. The starting inertia of the reel must be overcome by the unspent force transmitted from the sinker and hook through the line. This retarding of the force of the cast diminishes the distance that the sinker and hook may be projected.

My invention overcomes this difficulty by providing spring actuation of the spool in the forward direction (that is, the direction to unwind line) at the instant that the slack in the line is taken up during the procedure of casting. The reel continues to positively unwind the line and thus cancels out the inertia of starting the spool which necessarily limits the length of the throw or cast.

The objective of my invention is therefore to overcome the inertia of starting the reel to unwind or revolve in the forward direction during a casting of the line, sinker and hook.

Another objective of the invention is to provide a simple mechanism effecting the positive drive of the reel, with automatic release of the drive mechanism when the tension on the line starts to pull the line off the spool thereupon permitting free unwinding rotation of the spool, under the manual control of the operator to the end of the throw to prevent over-run of line.

These and other objectives are attained by my invention, which will be understood from the following description, reference being made to the accompanying drawings in which:

Fig. 5 is a sectional view taken on the line 5—5 of Fig. 4 showing the shifter means in shaft-engaged position;

Fig. 6 is a fragmentary view showing the operative relation of the cam and the shifter yoke;

Fig. 7 is a cross-sectional view taken on the line 7—7 of Fig. 5;

Fig. 8 is a cross-sectional view similar to Fig. 5 but showing the shifter means in shaft-disengaged position;

Fig. 9 is a fragmentary view showing the relation of the shifter yoke and cam for the retracted position shown in Figures 8 and 10;

Fig. 10 is a cross-sectional view taken on the line 10—10 of Fig. 8;

Fig. 11 is a sdie elevational view partly in section showing the spool and spindle assembly;

Fig. 12 is an end elevational view of the spool and spindle assembly of Fig. 11 taken from the position 12—12 of Fig. 11 showing the spring-engaging notched wheel;

Fig. 13 is an end elevational view of the spool and spindle assembly of Fig. 11 taken from the position 13—13 of Fig. 11;

Fig. 14 is an edge view of the torsion spring coil used to drive the spindle;

Fig. 15 is an end elevational view of the housing for the torsion spring;

Figure 1:
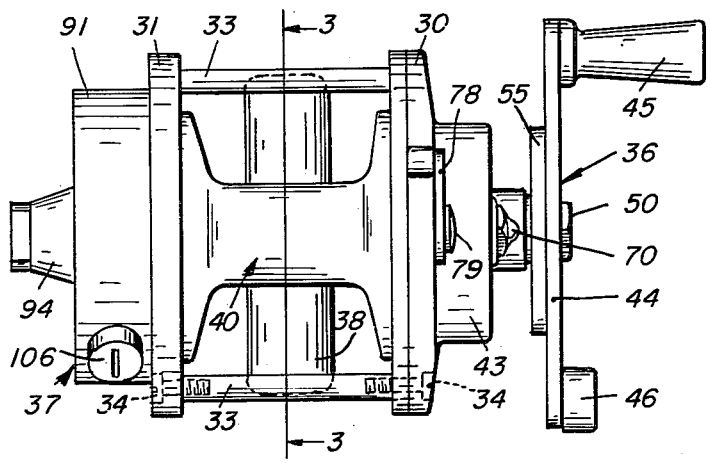
Fig. 1 is a top elevational view showing my improved fishing reel.
Figure 4:
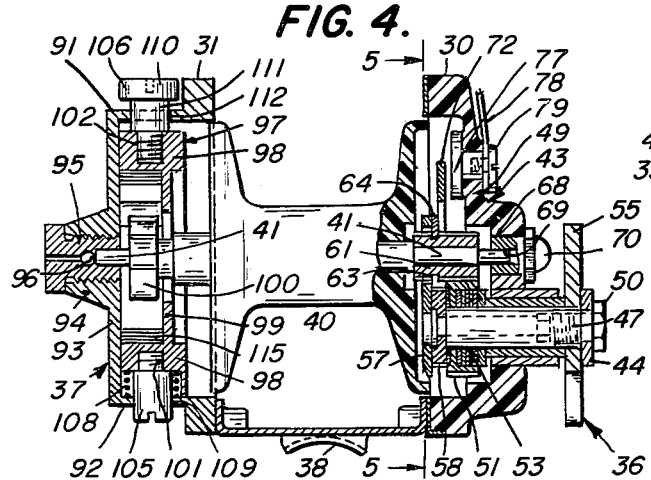
Fig. 4 is a cross-sectional view taken on the line 4—4 of Fig. 3.
Figure 3:
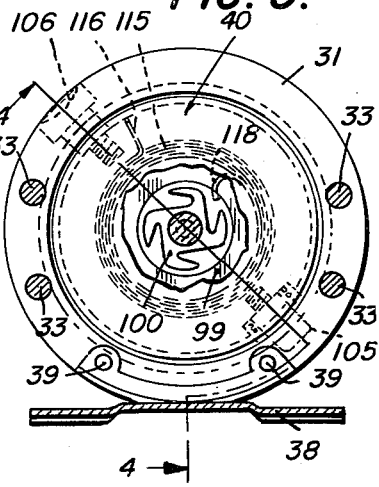
Fig. 3 is a cross-sectional view taken on the line 3—3 of Fig. 1 with parts broken away to show interior construction.
Figure 2:
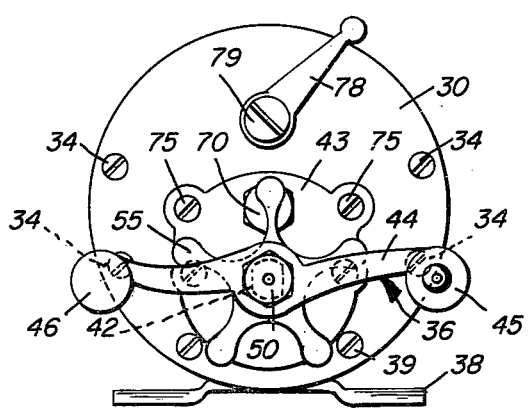
Fig. 2 is an end elevational view taken in the direction indicated by the line 2—2 of Fig. 1.
Figure 16:
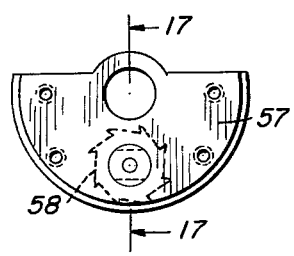
Fig. 16 is an elevational view of the mounting plate showing the mounting bearing for the hollow countershaft, and the ratchet mounted on said countershaft.
Figure 17:
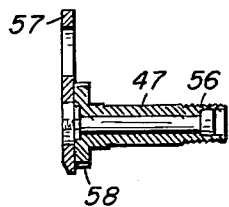
Fig. 17 is a cross-sectional view taken on the line 17—17 of Fig. 16.

The positive drive means of my invention may be applied to casting reels of the well-known type which have a spool, a multiplying gear and crank means for rotating the spool, including ratchet means to prevent reverse rotation, release means for disconnecting the crank operating means to allow the reel to rotate freely, and brake means for applying friction to the spool.

The driving mechanism may be supplied as an attachment to be installed on a reel, or it may be fabricated into a fishing reel having the characteristics set forth.

Figure 27:
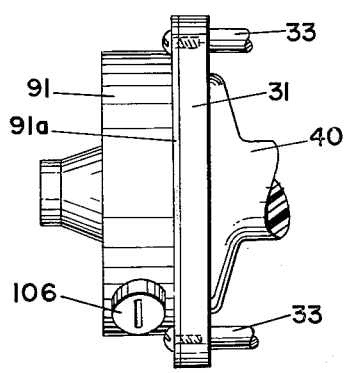
Fig. 27 is an alternative arrangement showing the spring housing attached to the end plate.

A typical fishing reel mechanism to which my improvement may be applied is shown in the drawings and will be described as follows:

The fishing reel of typical design consists of end plates 30 and 31 which are interconnected by end-threaded spacing bars 33 which are removably attached to both end plates by screws 34. The end plate 30 is integral with or attached to the housing 43 for the crank assembly 36, and the end plate 31 may be integral with or attached to my new spring driving assembly 37. In Fig. 27, the flanged housing 91A for the spring driving assembly is attached to the end plate 31 by screws.

An attachment bracket 38 for fastening the fishing reel on a fishing pole is attached between and to the end plates 30 and 31 by screws 39, this attachment bracket providing additional rigidity to the assembly of end plates and spacing bars.

A spool 40 is non-rotatably mounted on a spindle 41, the spool being adapted to rotate in the space between the end plates 30 and 31.

Referring now to the crank driving assembly 36, the end plate 30 as shown is attached to a short cylindrical housing 43 which encloses the gear train which is manually actuated by the crank lever 44 to rotate the spool in the direction to wind on the line. This crank lever 44 is provided with a handle 45 and a counter weight 46, the crank lever being non-rotatably attached to the hollow drive shaft 47 at the end thereof, said shaft at the end being of reduced diameter to form an abutting shoulder and flattened on the sides to receive the non-circular opening 42 in the crank lever 44. A closure oil plug 50 is threadedly attached to the end of the drive shaft 47, holding the crank lever 44 securely thereon.

The drive shaft 47 is provided with threads 56, and the shaft is flattened on opposite sides for the mounting thereon of non-rotatable disk brake elements 53 as will be described. The shaft 47 is rotatably mounted at the opposite end from the threads 56 to the mounting plate 57.

Figure 26:
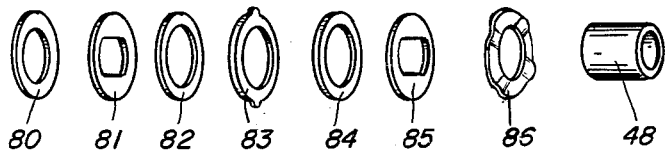
Fig. 26 is a disassembly view of the friction brake elements.

Adjacent the end of the shaft 47 opposite the crank lever 44 there is mounted the helical toothed drive gear 51, this drive gear being rotatable on the shaft 47. The drive gear is provided with an annular recess 52 in which a friction brake and clutch means 53 is disposed, the parts being mounted upon the shaft 47. The elements of the friction brake means 53 (as shown particularly in Fig. 26) consist, in order from the bottom of the annular recess 52 of a fiber washer 80, a brass disk 81 keyed to the flat sides of the countershaft, a second fiber washer 82, a brass washer 83 keyed to notches in the recess 52 of the gear 51, a third fiber washer 84, another brass washer 85 keyed to the countershaft, and a spring washer 86. An abutment sleeve 48 is pressed against the spring washer 86, and also against the stack of washers, by the face of the thumb wheel 55 which is threadedly mounted on the threads 56 of the countershaft 47. By rotating the thumb wheel 55, the movable sleeve 48 is pressed inwardly to increase the friction between the drive shaft 47 and the drive gear 51, which thereby provides manually adjustable friction to the spool 40 when the latter is in gear.

A ratchet wheel 58 is also mounted on the drive shaft 47 between the mounting plate 57 and the drive gear 51, there being a spring pressed ratchet lever 59 pivotally mounted adjacent the teeth of said ratchet wheel 58 to prevent rotation of the drive shaft in the unwinding direction when the drive gear 51 is engaged with the pinion 61, which is, in turn, releasably connected to the spindle 41 for the spool 40.

The pinion 61 which at times actuates the spindle 41 of the spool, is provided with helical teeth which mesh with the helical teeth of the drive gear 51. A peripheral groove 63 is provided intermediate the ends of the pinion 61, which groove is adapted to be engaged by the shifter yoke 64. The end of the pinion 61 facing the spool is provided with a diametrically positioned key slot 65 which is adapted to at times engage a key 66 on the spindle 41. The pinion 61 is rotatably mounted on the hollow bearing member 68, the hole 69 therein also serving as a bearing for the end of the spindle 41, the bearing 68 being mounted in the back wall 49 of the housing 43. An oil plug 70 is provided so that end of the spindle 41 may be lubricated.

Figure 18:
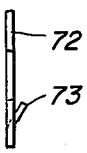
Fig. 18 is an elevational view of the shifter cam.
Figure 19:
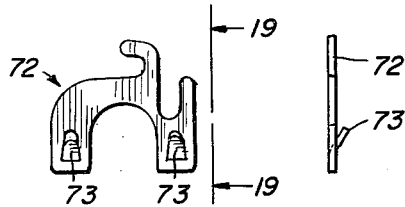
Fig. 19 is an edge elevational view of the shifter cam taken from the position 19—19 of Fig. 18.
Figure 20:
Fig. 20 is an elevational view of the shifter yoke.
Figure 21:
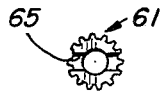
Fig. 21 is an end elevational view of the helical toothed pinion.
Figure 22:
Fig. 22 is a side elevational view of the helical toothed pinion shown in Fig. 21.
Figure 23:
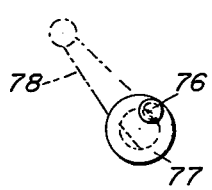
Fig. 23 is an elevational view of the cam shifter eccentric.
Figure 24:
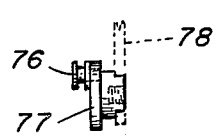
Fig. 24 is a side elevational view of the cam shifter eccentric for the cam shown in Fig. 18.
Figure 25:
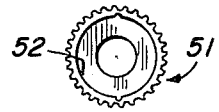
Fig. 25 is an elevational view of the helical drive gear.

The shifter yoke 64 is actuated by the inverted U-shaped shifter cam 72 (see Fig. 18). The shifter cam 72 is provided with strike out tabs 73 which are adapted to engage the face of the shifter yoke 64 and move it laterally against coil springs 74 whereby the pinion 61 whose peripheral groove 63 is engaged by the shifter yoke 64 is moved longitudinally in the bearing member 68 and on the spindle 41. This longitudinal or axial movement effects engagement or disengagement of the key 66 on the spool spindle 41 with the key slot 65 on the pinion gear. The shifter cam 72 is actuated by a crank pin 76 mounted on the stub shaft 77 which is rotatably mounted in the back wall 49 of the housing 43, the outside end of the said stub shaft being attached to a shifter lever 78, being fastened thereto by the screw 79. The shifter yoke 64 and the shifter cam 72 are held pressed together by the coil springs 74 mounted on the assembly bolts 75 which threadedly engage the mounting plate 57, the heads of the bolts holding the mounting plate on the housing 43.

By moving the shifter lever 78 the pinion gear 61 is moved in and out of engagement with the key of the spindle and the key slot 65 of the pinion gear, and the spool 40 is either in gear or is free to rotate.

The spring driving assembly 37 may be attached to or made integral with the end plate 31. In the preferred form shown the end plate 31 is integral with the cylindrical housing 91, being in the form of an external flange to said cylindrical housing 91, which housing has a cylindrical wall 92 and an outer closure plate 93, there being an axial hub 94 protruding from the closure plate and having mounted therein a sleeve bearing 95 and a ball thrust bearing 96 abutting the spool spindle 41.

A cylindrical spring cage 97 is movably disposed within the cylindrical housing 91. The cage 97 consists of side wall 98 and an end wall 99, the end wall 99 being provided with an axial opening through which the notched wheel 100 may be passed. The side wall 98 of the cage 97 is provided with diametrically opposed holes 101 and 102, these holes being provided with threads 103 and 104.

The guide pin 105 is threadedly attached in the hole 101 in the cage 97, the free end of said pin projecting out through the hole 109 in the wall 92 of the housing 91. A press button 106 is threadedly engaged at its threaded end in the threads 104 of the other hole 102 in the spring cage 97, the opposite end of the press button being provided with a head 110 and a smooth shank 111 which is arranged to slide in the hole 112 of the wall 92 of the housing 91.

A coil compression spring 108 is provided on said guide pin 105 between the cage and the inside wall of the housing, there being a recess 113 for the spring in the cage wall 98 around the hole 101.

Within the cage 97 there is provided a long coil torsion spring 115 whose fixed end 116 is fastened in an anchor slot 117. The other end of the spring 115 is formed as a hook 118 which is adapted at times to engage a tooth 119 on the notch wheel 100, which is attached to the spindle 41.

When it is desired to operate the spring driving assembly 37, the cage 97 is shifted laterally within the housing 91 by pressing on the head 110 of the press button 106. In this displaced position the hook 118 of the torsion spring 115 engages a tooth 119 on the notch wheel 100 when the spool spindle 41 is rotated in the winding in direction by the crank handle 45.

The torsion spring 115 is wound up to the desired amount, by turning the crank handle 45 attached to the spindle 41, a tooth on the notch wheel 100 engaging the ratchet 58 preventing unwinding. The release of the push button does not release the hook so long as the spring is in torque. When the shifter lever 78 is then moved to release the spool spindle 41 from engagement with the gear train and crank, the spindle and attached spool 40 will be rotated by the torsion spring 115 in the direction of unwinding the line on the spool.

Before making a cast, the spring 115 is wound up, the shifter lever 78 is released while the operator holds the spool against rotation with his thumb. After making the cast in the usual way, the operator manually releases the spool just before the slack in the line has been taken up by the cast line, which sets the spool in rotation to positively play out additional line. When the cast line (with attached sinker and hook) exerts a pull on the line on the spool, and the speed of rotation increases over that at which the spool is propelled by the torsion spring 115, the hook 118 disengages the tooth 119 on the notched wheel 100, and the free running spool unwinds the line in response to the pull of the cast sinker and bait hook on the line, to the end of the cast. Over-running is prevented in the usual way by using the thumb as a brake on the spool.

The advantages of overcoming the starting inertia of the spool by having the spool positively propelled in the unwinding direction will be apparent. When the cast line pulls the line out faster than the spring-propelled spool speed, the engagement with the torsion spring becomes automatically disengaged and the free spool unwinds in response to the pull on the line. The distance of casting has been increased up to 100 percent more than when the spool is not set in rotation prior to being actuated by the cast line.

I claim:

1. In a casting reel of the kind described having a spool on a spindle mounted for rotation in a reel frame having two end plates upon one of which is mounted crank means for turning said spool in the direction of winding on a line, and having manually operative means for disconnecting said crank means so that said spindle and spool are at times free to rotate in spindle bearings; a housing mounted on the other end plate, a spring-actuated line-unwinding means mounted in said housing, said unwinding means comprising a toothed wheel attached to said spindle, a spring-cage mounted within said housing and normally disposed substantially in axial alignment with said spool spindle and said toothed wheel, a coiled torsion spring having an outer end and an inner free end mounted within said spring-cage, the outer end of said spring being anchored to said cage, and the free end of said spring being provided with hook means engageable with a tooth on said toothed wheel when said cage is laterally moved out of axial alignment, means for holding said cage against rotation and manually operative means for laterally shifting said spring cage and enclosed spring out of alignment whereby to engage said spring and a tooth on said toothed wheel.

2. In a casting reel of the kind described having a spool on a spindle mounted for rotation in bearings supported in a reel frame formed from two end plates and spacer rods, with a crank and gear means for turning said spool in the direction of winding on a line mounted on one of said end plates, said crank and gear means, having manually operative means for disconnecting said crank and gear means so that said spindle and spool are at times free to rotate in the spindle bearings; a housing provided on the other of said end plates; a spring-actuated line-unwinding means mounted within said housing, said unwinding means for at times rotating said spool in the direction of unwinding a line, said last means comprising a toothed wheel attached to said spool spindle, a spring-cage normally disposed substantially in axial alignment with said spool spindle and said toothed wheel, a coiled torsion spring having an outer end and an inner free end mounted within said spring-cage, the outer end of said spring being anchored to said cage, and the free end of said spring being formed as a hook engageable with a tooth on said toothed wheel when said cage is laterally moved out of axial alignment, means for holding said cage against rotation, and manually operative means for shifting said spring-cage and enclosed spring out of axial alignment whereby to engage said hook and a tooth on said toothed wheel.

3. In a casting reel of the kind described having a spool on a spindle mounted for rotation in bearings supported in a reel frame formed from two end plates and spacer rods, with a crank and gear means for turning said spool in the direction of winding on a line mounted on one of said end plates, said crank and gear means, having manually operative means for disconnecting said crank and gear means so that said spindle and spool are at times free to rotate in the spindle bearings; a housing provided on the other of said end plates, a spring-actuated line-unwinding means mounted within said housing, said unwinding means at times rotating said spool in the direction of unwinding a line, said last means comprising a toothed wheel attached to said spool spindle within said housing, a spring-cage within said housing, said spring-cage being normally disposed in axial alignment with said spool spindle and said toothed wheel, a coiled torsion spring having an outer end and an inner free end mounted within said spring-cage, the outer end of said spring being anchored to said cage, and the free end of said spring being formed as a hook engageable with a tooth on said toothed wheel when said cage is moved out of axial alignment, means for holding said cage against rotation, a press-button means projecting through said housing for at times laterally shifting said spring-cage and enclosed spring out of alignment whereby to engage said hook and a tooth on said toothed wheel, and spring means disposed in opposition to said press button to return said spring-cage to its axial position.

4. In combination, a casting reel of the kind described comprising a spool mounted on a spindle, a reel frame composed of end plates and connecting spacer rods, bearings in said end plates for said spindle, a crank and gear means operatively mounted in one of said end plates for turning said spool in the direction of winding on a line including manually operative means for disconnecting said crank and gear means so that said spindle and spool are then free to rotate in the spindle bearings; a housing provided on the other end plate of said reel; and a spring-actuated line-unwinding motor means for at times rotating said spool in the direction of unwinding a line, said unwinding motor means comprising a toothed wheel attached to said spool spindle within said housing, a spring-cage laterally moveable within said housing, said spring-cage being normally disposed in axial alignment with said spool spindle and said toothed wheel, a coiled torsion spring having an outer end and an inner free end mounted within said spring-cage, the outer end of said spring being anchored to said cage, and the free end of said spring being formed as a hook engageable with a tooth on said toothed wheel when said cage is moved out of axial alignment, means for holding said cage against rotation, a press-button means projecting through said housing for at times laterally shifting said spring-cage and enclosed spring out of alignment with said spindle whereby to engage said hook and a tooth on said toothed wheel, and spring means disposed in opposition to said press button to return said spring-cage to its axial position.

5. A spring-actuated line-unwinding motor means adapted for attachment to a fishing reel of the kind described, comprising a housing attachable to an end plate of a fishing reel, a toothed wheel attached to the end of a spool spindle mounted in said end plate and extending into said housing, a spring-cage within said housing, said cage being normally disposed in axial alignment with the spool spindle and said toothed wheel, a coiled torsion spring having an outer end and an inner free end mounted within said spring-cage, the outer end of said spring being anchored to said cage, and the free end of said spring being formed as a hook engageable with a tooth on said toothed wheel when said cage is moved out of axial alignment, means for holding said cage against rotation, and manually operative shifter means extending through said housing for laterally shifting said spring-cage and enclosed spring out of alignment with said spindle whereby to engage said hook and a tooth on said toothed wheel.

6. The spring-actuated line-winding motor means defined in claim 5, in which the manually operative shifter means consists of a press-button attached to said spring-cage and extending through said housing, and spring means disposed in opposition to said press button to return said spring-cage to its axial position.

References Cited in the file of this patent

UNITED STATES PATENTS

| | | |
|---|---|---|
| 1,123,764 | Lavertine | Jan. 5, 1915 |
| 2,148,185 | Blocker | Feb. 21, 1939 |
| 2,290,268 | Blaser | July 21, 1942 |